United States Patent [19]

Cheshire

[11] 4,230,414
[45] Oct. 28, 1980

[54] RATCHET-ACTION HINGE DEVICE

[75] Inventor: Ernest L. Cheshire, Hartwell, England

[73] Assignee: UOP Inc., Des Plaines, Ill.

[21] Appl. No.: 950,184

[22] Filed: Oct. 10, 1978

[30] Foreign Application Priority Data

Oct. 18, 1977 [GB] United Kingdom ............... 43242/77

[51] Int. Cl.² ............................................. E05D 11/10
[52] U.S. Cl. ...................................... 403/95; 16/146;
297/369
[58] Field of Search ............... 297/369, 367, 366, 356, 297/373, 417; 188/82.77, 82.3, 82.34; 403/95, 96; 16/146

[56] References Cited

U.S. PATENT DOCUMENTS

| 773,720 | 11/1904 | Drury ................................. 297/356 |
|---|---|---|
| 1,908,905 | 5/1933 | Landahl .............................. 188/82.77 |
| 2,217,352 | 10/1940 | Todd et al. ....................... 297/356 X |
| 2,750,007 | 6/1956 | Turner et al. ..................... 188/82.77 |
| 2,941,583 | 6/1960 | Tischler et al. .................... 297/369 |
| 3,737,946 | 6/1973 | Giuliani .......................... 297/367 X |

FOREIGN PATENT DOCUMENTS 1630103  8/1971  Fed. Rep. of Germany ........... 297/417

*Primary Examiner*—Andrew V. Kundrat
*Attorney, Agent, or Firm*—James R. Hoatson, Jr.; Barry L. Clark; William H. Page, II

[57] ABSTRACT

A hinge device for supporting an armrest on a vehicle seat includes a ratchet mechanism in which ratchet teeth are disposed around the inside of a ratchet ring for engagement with a pawl carried by a rotor within the ring. A blocking ring coaxial with the ratchet ring is overlapped by the pawl and is carried along by engagement of the pawl in a recess of the blocking ring as the pawl ratchets over the teeth. After clearing the ratchet teeth, the pawl is lifted by cam action from the recess on to the inner surface of the blocking ring which masks the ratchet teeth and allows the pawl to be returned to its starting position where it is restored by cam action to its recess in the blocking ring wherein it can once again engage the ratchet teeth.

3 Claims, 9 Drawing Figures

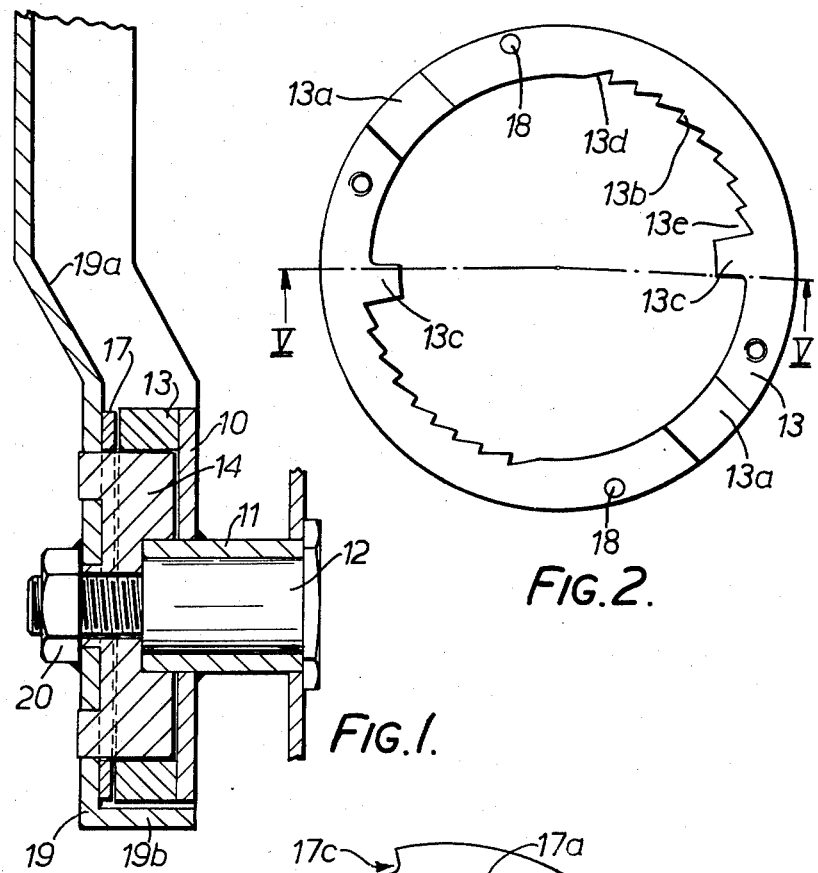
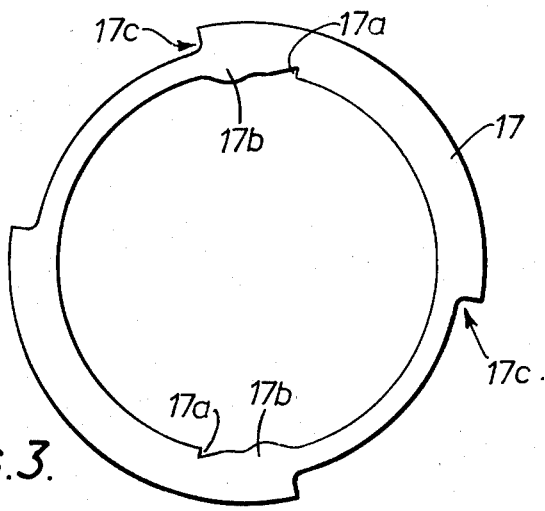

RATCHET-ACTION HINGE DEVICE

BACKGROUND OF THE INVENTION

This invention relates to a hinge device and in particular to a seat having an arm rest supported thereon by means of a hinge device.

More particularly, the hinge device is of the type which incorporates a ratchet mechanism and which is operable to support a hinged part at any selected one of a plurality of rotational positions, each defined by engagement of a pawl with a different tooth of the ratches mechanism, the hinge mechanism including means operable after the pawl has ratcheted across the teeth of the ratchet to hold the pawl out of engagement with the ratchet teeth and thereby allow the hinged part to be rotated in the opposite direction until the pawl has cleared the ratchet teeth in said opposite direction. Such a hinge mechanism will be referred to hereinafter on occasion, as being 'of the type described'.

Hinge mechanisms of the type decribed have been proposed hitherto, but there is a requirement for a design of such as hinge mechanism which is robust and reliable with a view to providing trouble-free operation over a long period of time in situations in which it is liable to receive rough usage.

The application for which the hinge mechanism of the present invention is particularly intended is to support an armrest on the back of a vehicle seat in such a way as to enable the inclination of the armrest relative to the back of the seat to be varied according to the inclination of the back of the seat, and also to enable the armrest to be dropped down to an inoperative position in which it does not obstruct a person wishing to occupy or leave the vehicle seat.

SUMMARY OF THE INVENTION

According to the present invention there is provided a hinge device for pivotally interconnecting two parts and including a ratchet mechanism comprising a first member carrying a row of ratchet teeth and secured to one of said parts, a second member carrying a pawl and secured to the other of said parts for movement relative to the ratchet teeth about the axis of the hinge device, the pawl being engageable with any selected one of said teeth to support said parts relative to each other in any selected one of a plurality of predetermined angularly-spaced positions corresponding to the angular spacing between the teeth of the ratchet mechanism and de-activating means operable after the pawl has ratcheted across the last tooth in said row, as a result of relative rotation of said parts in one direction, to maintain the pawl out of engagement with the ratchet teeth and thereby allow relative rotation of said parts in the opposite direction until the pawl has cleared the ratchet teeth in said opposite direction characterised in that said de-activating means comprise a component which is engageable with the pawl in response to movement of said members into a first relative position, is disengageable from the pawl in response to movement of said members into a second relative position, and holds said pawl away from said ratchet tooth over the path of movement of said members between said first and second positions.

The present invention also provides a hinge device for pivotally interconnecting two parts and including a ratchet mechanism comprising a first member carrying a row of ratchet teeth and secured to one of said parts, a second member carrying a pawl and secured to the other of said parts for movement relative to the ratchet teeth about the axis of the hinge device, the pawl being engageable with any selected one of said teeth to support said parts relative to each other in any selected one of a plurality of predetermined angularly-spaced positions corresponding to the angular spacing between the teeth of the ratchet mechanism and de-activating means operable after the pawl has ratcheted across the last tooth in said row, as a result of relative rotation of said parts in one direction, to maintain the pawl out of engagement with the ratchet teeth and thereby allow relative rotation of said parts in the opposite direction until the pawl has cleared the ratchet teeth in said opposite direction characterised in that said de-activating means is a component which, when rendered operative, is movable along a path adjacent said ratchet teeth and is effective to support the pawl at a radial level at which it is disengaged from the ratchet teeth and means are provided for rendering the component operative or inoperative in response to relative rotation of said parts.

BRIEF DESCRIPTION OF THE DRAWINGS

The invention will now be particularly described, by way of example, with reference to the accompanying drawings in which:

FIG. 1 is an axial section through a hinge device pivotally supporting an armrest on a vehicle seat, for angular adjustment in a vetical plane, the device having a ratchet mechanism including a first end plate, a ratchet ring superimposed on the first end plate, a blocking ring superimposed on the ratchet ring, a pawl carrier concentric with and surrounded by the ratchet ring and the blocking ring, and a second end plate integral with an armrest plate;

FIG. 2 is a plan view of the ratchet ring, to an enlarged scale;

FIG. 3 is a plan view of the blocking ring, on same scale as FIG. 2;

DESCRIPTION OF THE PREFERRED EMBODIMENT

As shown in FIG. 1 the ratchet mechanism of the hinge device comprises a first end plate 10 mounted on and keyed or welded to a hollow shaft 11 just short of one end of the shaft, the shaft extending perpendicular to the plate 10. A pivot bolt 12 fits within and projects beyond the end of the hollow shaft, the projecting portion of the bolt being of reduced diameter.

Figure 5:
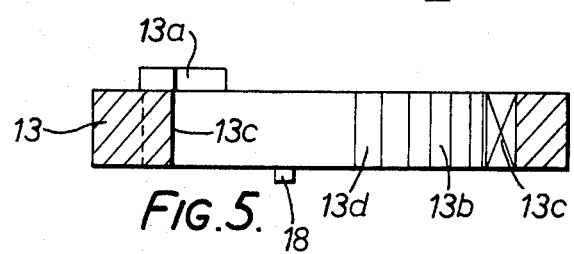
FIGS. 5, 6 and 7 are sections on the lines V—V of FIG. 2 and VI—VI and VII—VII of FIG. 4 respectively.

A ratchet ring 13 (FIGS. 1, 2 and 5) having an outer diameter corresponding to that of the first end plate is superimposed on the end plate, and secured, against rotation relative thereto, by a pair of diametrically opposite lugs 13a. These lugs 13a project from the plane of the ring 13 and engage in corresponding apertures in the end plate 10. On its inner surface, the ratchet ring has two diametrically opposite rows each containing a number (e.g. eight) of ratchet teeth 13b spaced apart at intervals of about 8° the remainder of the inner surface of the ratchet ring being circular, at a radial distance equal to that of the tips of the ratchet teeth, except for two radially inwardly extending stops 13c each located adjacent the upstream end of a respective row of the ratchet teeth.

Figure 4:
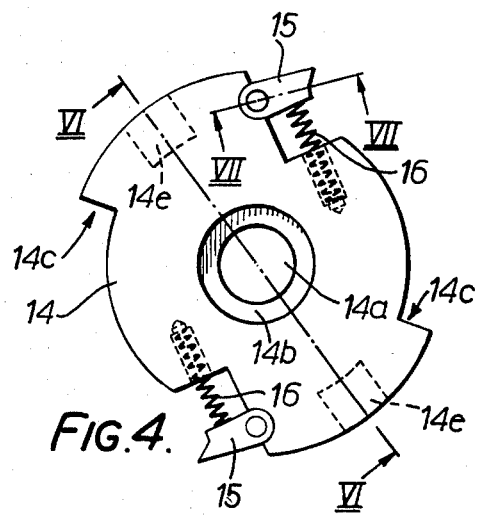
FIG. 4 is a plan view of the pawl carrier on the same scale as FIG. 2.
Figure 6:
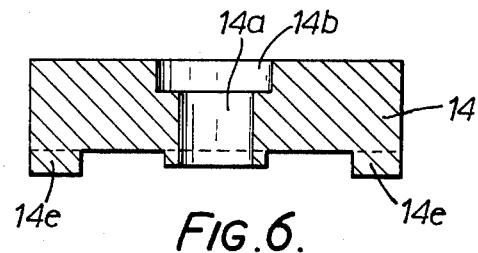
Figure 7:
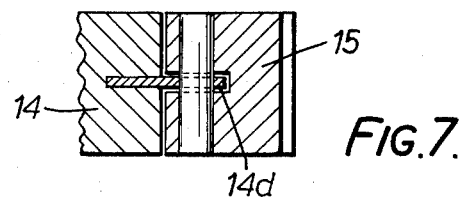

A pawl carrier 14 (FIGS. 1, 4 and 6) is formed by a plate of greater thickness than the ratchet ring and dimensioned to fit within the ratchet ring, the pivot bolt 12 passing through a central aperture 14a of the pawl carrier. The pawl carrier plate is recessed at 14b around the central aperture to receive the adjacent end of the hollow shaft. The periphery of the pawl carrier plate has a recess 14c, over each of two diametrically opposite arcs of about 120°, to receive the stops 13c of the ratchet ring and limit the angular movement of the pawl carrier. A pawl 15 is pivotally supported, at the anticlockwise end of each recess, on a thin pivot plate 14d (FIG. 7) mounted in the end of the recess and lying equidistant from the opposite axial faces of the pawl carrier plate. The axial width of the pawl is equal to that of the pawl carrier plate, and the pivot plate is received in a recess in the pawl equidistant from its opposite sides. Two helical springs 16, having one end anchored in a hole in the pawl carrier plate, each engage the corresponding pawl adjacent its outer end to bias the pawl radially outwardly against the inner surface of the ratchet ring.

A blocking ring (FIG. 3) having inner and outer diameters corresponding to those of the ratchet ring is superimposed on the ratchet ring and fits around the pawl carrier plate, the depth of the pawl carrier plate being slightly greater than the combined depth of the blocking ring and ratchet ring.

The inner surface of the blocking ring 17 is circular except for a recess 17a corresponding in shape to the space between two ratchet teeth and in which the end of the pawl can be received. To the rear (i.e. in the anticlockwise direction) of each pawl-receiving recess 17a, a smooth hump-shaped cam 17b projects radially inwardly from the inner surface of the blocking ring 17 to form a detent for engagement with the radially-outer face of the pawl 15 in response to anticlockwise rotation of the pawl carrier plate 14.

The outer periphery of the blocking ring is formed with two outer recesses 17c each extending over about 70° of arc and each receiving therein a stop pin 18 projecting from the adjacent surface of the ratchet ring 13. Each stop pin 18 is located to engage the clockwise end of the corresponding outer recess 17c of the blocking ring in the position (see FIG. 9) in which the pawl-receiving recess 17a of the blocking ring 17 is superimposed on the last pawl-receiving recess 13d at the downstream end of the row of ratchet teeth. Each stop pin 18 is located to engage the opposite (i.e. anticlockwise) end of the corresponding outer recess 17c of the blocking ring 17 in the position (see FIG. 8) in which the pawl-receiving recess 17a of the blocking ring is superimposed on the first pawl-receiving recess 13e at the upstream end of the row of ratchet teeth.

The superimposed parts of the mechanism described above are held together by a second end plate 19 fitted on the bolt 12 and superimposed on the pawl carrier 14 and blocking ring 17, the plate being secured on the shaft by a nut 20. The pawl carrier has two diametrically opposite lugs 14e which engage corresponding apertures in the second end plate 19 to lock the pawl carrier and the second end plate together. The second end plate, as shown in FIG. 1, has an integral radial extension 19a forming an armrest plate to which an upholstered armrest block can be secured. The second end plate is also formed with a skirt portion 19b to partially surround and protect the moving parts of the ratchet mechanism.

Figure 8:
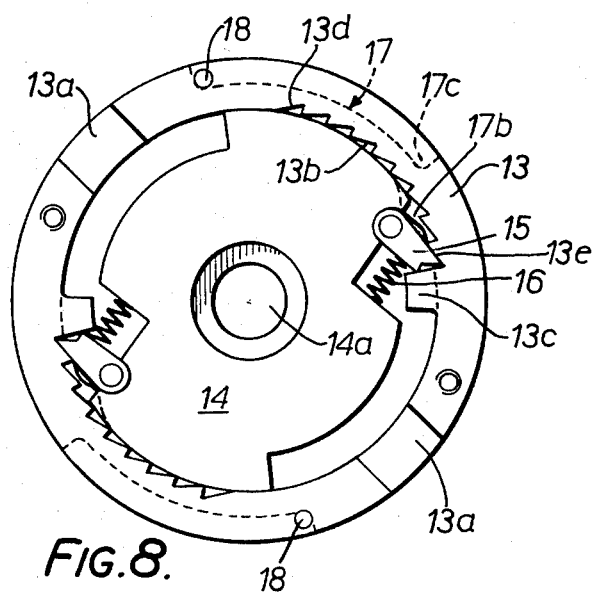
FIG. 8 is a section through the mechanism showing the pawl in engagement with the ratchet.
Figure 9:
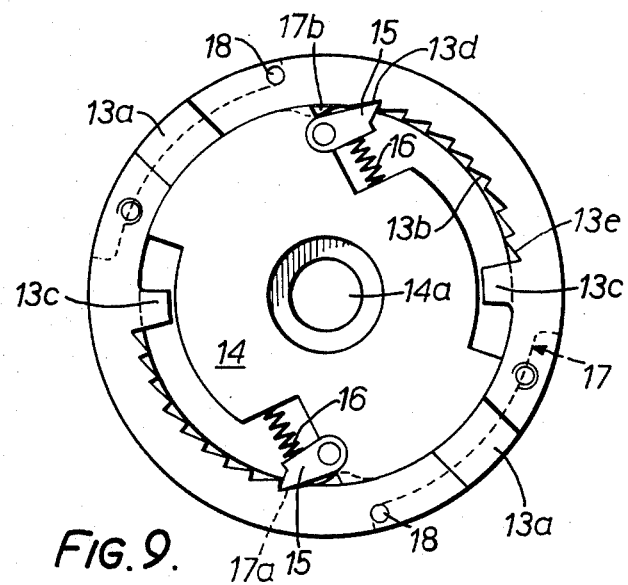
FIG. 9 is a view corresponding to that of FIG. 8 but in which the pawl is about to be rendered inoperative by the blocking ring.

The operation of the ratchet mechanism will now be described, starting from the position shown in FIG. 8 and referring only to one pawl and row of ratchet teeth, since the operation of the other pawl and ratchet teeth is identical.

Upon rotation of the pawl carrier 14 in an anticlockwise direction, the pawl 15 will ratchet from tooth to tooth of the row of ratchet teeth 13b and will carry the blocking ring 17 with it, by reason of the cam 17b being pushed along by the radially outer surface of the pawl 15.

If the mechanism is halted in any position in which the pawl 15 engages a tooth of the ratchet, clockwise rotation of the second end plate 19 of the mechanism, and hence of the armrest plate 19a, is prevented. The armrest is therefore supported in any inclined position in which the pawl 15 engages one of the teeth 13b of the ratchet, and the armrest inclination can therefore be increased in steps of 8° over an angular range equal to 8° multiplied by the number of recesses between teeth of the row of ratchet teeth.

However, when the pawl carrier 14 is rotated anticlockwise to the downstream end of the row of ratchet teeth, the blocking ring 17 engages the stop pin 18, and further anticlockwise rotation of the pawl carrier causes the pawl 15 to ride over the humped cam 17b of the blocking ring into a position in which it engages the inner surface of the blocking ring 17 behind the cam 17b.

If now the pawl carrier 14 is rotated in a clockwise direction, the pawl 15 will remain supported on the inner surface of the blocking ring 17, and upon engagement of the pawl with the cam 17b, the blocking ring will be carried round by the pawl carrier until the stop pin 18 engages the anticlockwise end of the recess 17c in the blocking ring to halt the blocking ring. Further clockwise rotation of the pawl carrier will cause the pawl 15 to ride over the cam 17b of the blocking ring into the position shown in FIG. 8. This represents a free movement of the armrest from its uppermost inclined position to its lowermost inclined position. The armrest can then be raised from its lowermost position into any selected position in which the pawl engages a tooth of the ratchet.

The above-described mechanism finds particular application in a vehicle seat in which the inclination of a back support to the vertical can be raised over a predetermined angular range, and it is desirable to adjust in a corresponding manner the inclination of an armrest mounted on the back support.

In an alternative embodiment, similar in other respects to the embodiment described above, the pivoted pawls have been replaced by pawls formed as plungers slidable radially with respect to the pawl carrier and spring-biassed in a radially outward direction, each plunger carrying a ratchet tooth at its radially outer end.

I claim:

1. A hinge device for pivotally interconnecting two parts and including a ratchet mechanism comprising a first ring member secured to one of said parts and carrying a row of ratchet teeth on its inner periphery, a rotor member secured to the other of said parts for movement relative to the ratchet teeth about the axis of the hinge device, said rotor member being located concentrically within said first ring member, a pawl carried by said rotor member and engageable with any selected one of said teeth to support said parts relative to each other in any selected one of a plurality of predetermined angularly-spaced positions corresponding to the angular spacing between the teeth of the ratchet mechanism, de-activating means operable after the pawl has ratcheted across the last tooth in said row, as a result of relative rotation of said parts in one direction, to maintain the pawl out of engagement with the ratchet teeth and thereby allow relative rotation of said parts in the opposite direction until the pawl has cleared the ratchet teeth in said opposite direction, said de-activating means comprising a second ring which is concentric with the first ring member and is engageable with the pawl in response to movement of said members into a first relative position, is disengageable from the pawl in response to movement of said members into a second relative position, and holds said pawl away from said ratchet tooth over the path of movement of said members between said first and second positions, said second ring being mounted for movement with said pawl along a path disposed adjacent said ratchet teeth, said second ring including a radially inwardly projecting detent behind which said pawl can engage in response to movement of the pawl as said members enter said first relative position, the said second ring being coupled to said rotor member for movement therewith between said first and second positions, the detent holding the pawl at a radial distance from the hinge axis at which it clears the ratchet teeth, movement of the pawl into said second position causing release of the pawl from the detent, the second ring being disposed adjacent the first ring in the axial direction, the pawl being elongate axially to bridge across both said rings and engage either said ratchet teeth or said detent.

2. The hinge device of claim 1 wherein a pair of stops carried by said first ring member contact said second ring member and limit its path of travel so that further movement of the rotor member relative to said first ring member will engage the pawl with the detent in one direction and release it in the other direction.

3. The hinge device of claim 1 wherein said ratchet mechanism is housed between a pair of plate portions so that unauthorized access to its moving parts is prevented.

* * * * *